United States Patent Office 3,022,151
Patented Feb. 20, 1962

3,022,151
ESTERS OF THIOCARBOXYLIC ACIDS
Norman Edward Searle, Wilmington, Del., assignor to E. I. du Pont de Nemours and Company, Wilmington, Del., a corporation of Delaware
No Drawing. Filed May 16, 1957, Ser. No. 659,472
11 Claims. (Cl. 71—2.6)

This invention relates to novel halogen-containing esters of thiocarboxylic acids having a hydroxyl group on the non-carboxylic carbon attached to sulfur of the ester group. The invention is also directed to herbicidal compositions containing these novel compounds and to methods employing these compounds.

The search for compounds that exert profound and selective influence upon the growth of plants is of great imporance. In recent years, certain organic compounds have been found to exert plant growth regulant properties. Illustrative of such compounds are esters of 2,4-dichlorophenoxyacetic acid which have been used with considerable economic advantage to control broad-leaved weeds. Many of these halogen containing compounds are either readily volatile or difficult to formulate for herbicidal or plant growth regulating applications. The compounds of this invention overcome these deficiencies to a great extent.

It is an object of this invention to produce novel esters of thiocarboxylic acids. It is a further object of this invention to produce compounds which are effective plant growth regulants and herbicides for both broad-leaved and grass type weeds. Still a further object is the preparation of novel herbicidal formulations containing these novel compounds. These and further objects will become apparent from the disclosure.

The novel compounds of the invention are halogen-containing esters of thiocarboxylic acids having a hydroxyl group on the non-carboxylic carbon attached to sulfur of the ester group. These compounds can be represented by the following formula $$\text{R}-\overset{\text{O}}{\underset{\|}{\text{C}}}-\text{S}-\overset{\text{OH}}{\underset{|}{\text{C}}}\text{HR}'$$

wherein R is hydrocarbon, oxahydrocarbon (i.e., hydrocarbon except for ether oxygen), halogenated hydrocarbon, or halogenated oxahydrocarbon having no more than 2 hydrogens attached to the alpha carbon and R' is hydrogen, hydrocarbon or halogenated hydrocarbon with the proviso that at least one of R and R' contains halogen.

The new esters can be prepared by reaction of a thiol acid with an aldehyde wherein at least one of the reactants contains halogen. Preferably each of the reactants has up to 8 carbon atoms and the resulting ester has up to 6 halogens.

The thiol acid reactant used in preparing the compounds of the invention has the formula

wherein R has the meaning previously applied to it. Specific thiol acids that can be used in addition to those of the examples which follow include alpha, alpha-dichlorothiolpropionic, dichlorothiolacetic, p-chlorophenylthiolacetic, 2,3,5,6-tetrachlorothiolbenzoic, and p-bromothiolbenzoic acids.

The aldehyde reactant as used in the present invention is of the formula R'CHO wherein R' has the significance previously attributed to it. Suitable aldehydes in addition to those recited in the following examples include dichloroacetaldehyde, butyraldehyde, 2-ethylhexanal, heptaldehyde, p-bromobenzaldehyde, p-bromophenylacetaldehyde, and butylchloral.

The reaction takes place generally at temperatures of 0 to 75° C. with room temperature being satisfactory.

Inert solvents or diluents are preferred to maintain homogeneous conditions. The diluent employed is dependent upon the specific reactants. Water is satisfactory where one or both of the reactants are water-soluble. The reaction takes place under acidic conditions, i.e., at a pH of less than 7 and preferably less than 6. The thiol acid is sufficiently acidic for many systems, and it may not be necessary to add further acid.

The reacting proportions are not critical. The ingredients react in an equimolar ratio. The use of excesses of one or the other of the ingredients while not detrimental is not believed to be of any additional value.

The following examples serve to illustrate the preparation of the new compounds of this invention.

EXAMPLE I 2,2,2-trichloro-1-hydroxyethyl thiolbenzoate

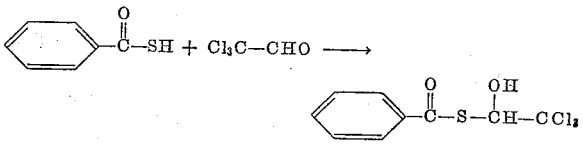

A solution of 22.2 g. (0.15 mole) of chloral in 50 ml. of n-hexane was added to a solution of 18.0 g. (0.13 mole) of thiolbenzoic acid in 200 ml. of n-hexane. The reaction was controlled at 25–35° by external cooling. The original yellow color of the solution was completely discharged and white crystals precipitated. After cooling to 5°, the crystals were separated and washed with cold n-hexane. The yield was 32.9 g. (89%) of white unctuous platelets, which melted at 84–86°. Recrystallization from cyclohexane yielded 27.6 g. (74%) of fluffy white crystals, which melted at 84–86°.

*Analysis.*—Calcd. for $C_9H_7Cl_3O_2S$: C, 37.90; H, 2.47; Cl, 37.25; S, 11.20. Found: C, 38.17; H, 2.60; Cl, 37.24; S, 11.23.

EXAMPLE II 2,2,2-trichloro-1-hydroxyethyl trichlorothiolacetate

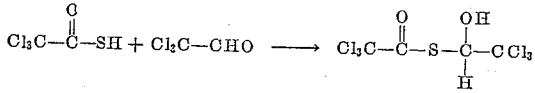

A solution of 22.2 g. (0.15 mole) of chloral in 50 ml. of n-pentane (B.P. 33.9–37.8°) was added over a period of 12 minutes to a solution of 23.4 g. (0.13 mole) of trichlorothiolacetic acid in 200 ml. of n-pentane. On cooling, the reaction mixture precipitated crystals. The addition of 250 ml. of n-pentane was required to maintain a fluid mixture. The product was crystallized and separated by pressure filtration with nitrogen, and dried in vacuo over phosphorus pentoxide. The yield was 22.5 g. (53%) of white crystalline power which melted at 43–47°. An additional 18.3 g. of product (M.P. 42–44°) was recovered from the filtrate (total yield 96%). This compound forms a 50% solution in n-hexane at 20°.

*Analysis.*—Calcd. for $C_4H_2Cl_6O_2S$: C, 14.70; H, 0.62; Cl, 65.15; S, 9.79. Found: C, 14.81; H, 1.01; Cl, 64.92; S, 9.91.

EXAMPLE III

*p-Chloro-α-hydroxybenzyl 4-chlorothiolbenzoate*

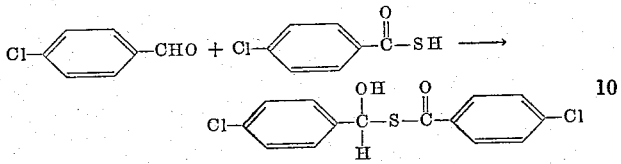

A solution of 14.1 g. (0.1 mole) of p-chlorobenzaldehyde (M.P. 46.5–47.5°) in 100 ml. of n-pentane was mixed with a solution of 17.3 g. (0.1 mole) of p-chlorothiolbenzoic acid in 300 ml. of n-pentane. The clear yellow solution was heated at the boil (42°) for 5 minutes and then cooled slowly to 0°. The heavy precipitate of white crystals was separated by pressure filtration, washed with cold n-pentane, and dried over phosphorus pentoxide. The yield was 27.1 g. (87%) of slightly yellow crystals, which melted at 50–51°.

*Analysis.*—Calcd. for $C_{14}H_{10}Cl_2O_2S$: C, 53.70; H, 3.22; Cl, 22.65; S, 10.23. Found: C, 53.59; H, 3.18; Cl, 22.30; S, 10.53.

EXAMPLE IV

*3,4-dichloro-α-hydroxybenzyl thiolbenzoate*

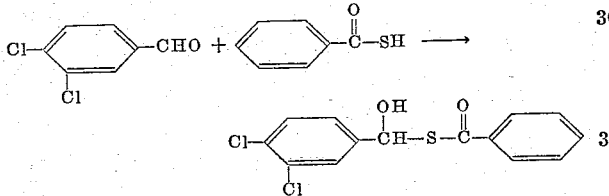

Following the procedure outlined in Example III above, 3,4-dichlorobenzaldehyde and thiolbenzoic acid were reacted together in a 0.1-mole ratio to give a 70% yield (21.9 g.) of product after recrystallization from n-pentane. The fine, white, fluffy needle crystals melted at 53–4°.

*Analysis.*—Calcd. for $C_{14}H_{10}Cl_2O_2S$: C, 53.7; H, 3.22; Cl, 22.6; S, 10.2. Found: C, 53.8; H, 3.26; Cl, 22.1; S, 10.8.

EXAMPLE V

*Hydroxymethyl 2,4-dichlorophenoxythiolacetate*

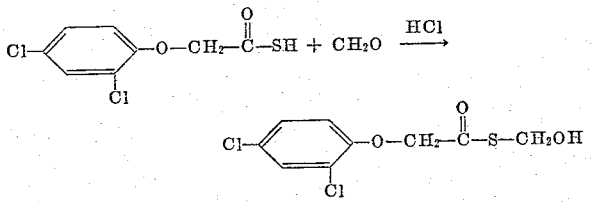

A mixture of 23.7 g. (0.1 m.) of 2,4-dichlorophenoxythiolacetic acid, 100 ml. of water, 100 ml. of methylene chloride, and 32.5 g. (0.4 m.) of 37% aqueous formaldehyde solution was stirred at 25±3° while 10 ml. of concentrated hydrochloric acid was added over a period of 15 minutes. Stirring was continued for an additional 45 minutes at 25–28°, and the organic layer was separated. The aqueous layer was extracted three times with 25-ml. portions of methylene chloride. The combined methylene chloride solutions were washed four times with 100-ml. portions of distilled water, dried over sodium sulfate, and concentrated on the steam bath under a jet of nitrogen at a temperature no higher than 40°. The final traces of solvent were removed at 25°/60 ml. in a small distilling flask with nitrogen ebullition. The weight of crude product was 26.2 g. (98% yield). The fine, white powder melted at 81–4°. Attempts to purify further by recrystallization did not result in an improved melting-point.

*Analysis.*—Calcd. for $C_9H_8Cl_2O_3S$: C, 40.5; H, 3.02; Cl, 26.5; S, 12.0. Found: C, 40.5; H, 3.12; Cl, 26.5; S, 11.8.

EXAMPLE VI

*Hydroxymethyl 2,4,5-trichlorophenoxythiolacetate*

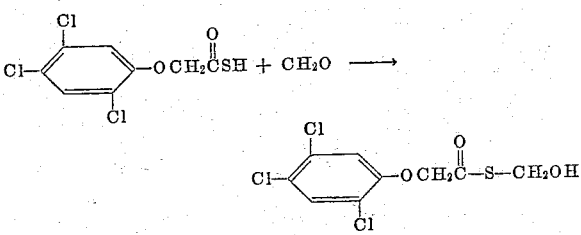

Repeating the general procedure of Example V with 2,4,5-trichlorophenoxythiolacetic acid, there was obtained a 96% yield of crude product which, after recrystallization from 1:1 benzene-cyclohexane, amounted to 21.1 g. (70% yield) of fine, white crystals which melted at 111–112° after shrinking at 110°.

*Analysis.*—Calcd. for $C_9H_6Cl_3O_3S$: C, 35.9; H, 2.34; Cl, 35.3; S, 10.6. Found: C, 36.1; H, 2.53; Cl, 35.1; S, 10.7.

EXAMPLE VII

*Hydroxymethyl 2,3,6-trichlorothiolbenzoate*

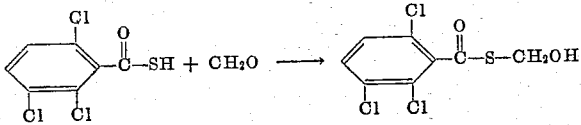

A mixture of 24.1 grams (0.1 mole) of trichlorothiolbenzoic acid (obtained as shown below), 100 ml. of water, 100 ml. of methylene chloride, and 32.5 grams (0.4 mole) of 37% aqueous formaldehyde solution was stirred at 22–24° C. while 10 ml. of concentrated hydrochloric acid was added over a period of 9 minutes. Stirring was continued for a total time of 4 hours at 22–26° C., and the organic layer was separated. The aqueous layer was extracted three times with 25-ml. portions of methylene chloride. The combined methylene chloride solutions were washed four times with 100-ml. portions of distilled water, dried over sodium sulfate, and concentrated on the steam bath under a jet of nitrogen at a temperature no higher than 40° C. The final traces of solvent were removed at 28–30° C./>1 mm. in a distilling flask with nitrogen ebullition. The crude product was obtained as a white, crystalline solid which, after recrystallization from 450 ml. of 25:75 n-hexane-cyclohexane, amounted to 18.2 grams (67% yield) of white, crystalline powder which melted at 98–102° C.

*Analysis.*—Calcd. for $C_8H_5Cl_3O_2S$: C, 35.4; H, 1.85; Cl, 39.2; S, 11.8. Found: C, 35.8; H, 2.03; Cl, 39.1; S, 11.9.

The trichlorothiolbenzoic acid was prepared by the following procedure:

A solution of 82.8 grams of 85% potassium hydroxide in 400 ml. of 85% ethanol was saturated with hydrogen sulfide at 0–4° C. during a period of one hour. With stirring and sufficient cooling to maintain the temperature at 3–9° C., 139.0 grams of 2,3,6-trichlorobenzoyl chloride was added over a period of 43 minutes. The mixture was stirred for an additional one-half hour, and finally it was warmed at 28–30° C. for 15 minutes.

The reaction product was cooled to 5° C., diluted with 500 ml. of cold water, and the solution acidified to pH 1 by the addition of 135 ml. of cold concentrated hydrochloric acid. The yellow oil was separated, and the aqueous phase was extracted seven times with 50-ml. portions of methylene chloride. The combined oil and methylene chloride extracts were washed six times with 200-ml. portions of water and dried over sodium sulfate. The solution was filtered, and the clear filtrate was concentrated on the steam bath at a temperature no higher than 45° C. under a jet of nitrogen. The remaining solvent was removed in a small distilling flask at 50° C./0.10 mm. Final traces of solvent were removed at 30–40° C./0.05 mm. The yield was 134.1 grams (98%) of yellow, somewhat viscous oil; $n_D^{25}$ 1.6188.

*Analysis.*—Calcd. for $C_7H_3Cl_3OS$: C, 34.8; H, 1.25; S, 13.2. Found: C, 34.8; H, 1.34; S, 13.4.

Although the examples are directed to chlorinated compounds the corresponding brominated compounds can be prepared in the same manner and have the same utilities as the chlorine compounds.

The esters of the invention are neutral oil-soluble compounds which are of sufficient stability in aqueous emulsions or dispersions and in organic solvents to be useful for the preparation of herbicidal formulations. The halogenated hydroxy-containing thiol esters are in general considerably more stable than the non-halogenated esters. The high solubility of these esters suggests that the compounds form six-membered hydrogen-bonded ring structures. However, study of the nuclear magnetic resonance behavior indicates that the hydrogen is not chelated and the compounds rather unexpectedly do not form ring structures.

The new esters are generally solids and can be removed from the reaction mixture by crystallization or separated by removal of added solvents.

The new compounds of this invention have physiological activity and are particuarly effective as herbicides. These compounds which are cellular regulants and particularly plant regulants can be applied in a number of ways. Generally they are formulated by mixture with conventional carrier material or conditioning agent. This provides a formulation adapted for ready and efficient application to soil, weeds, or unwanted plants using conventional applicator equipment. Thus for the practice of the present invention these compounds can be formulated into herbicidal compositions such as described in Todd U.S. Patents 2,655,444 through 2,655,447.

Pest control adjuvants such as dusts, solvents wetting, dispersing and emulsifying agents set forth in U.S. Patent 2,426,417 can be employed in preparing the herbicidal composition of the present invention. Other wetting, dispersing or emulsifying agents such as those listed in detail in Bulletin E–607 of the Bureau of Entomology and Plant Quarantine of the U.S. Department of Agriculture, and those set out in an article by McCutcheon in, "Soap and Chemical Specialties," July through September 1955, entitled, "Synthetic Detergents and Emulsifiers," can also be used and are collectively known to the art as surface-active agents. Preferred herbicidal compositions of the present invention are in the form of water-dispersible powders. They can be prepared by mixing one or more of the active compounds with a surface-active agent and a finely divided solid carrier such as talc, pyrophyllite, natural clays, diatomaceous earth and other powdered diluents such as those set out in the aforementioned patents. The surface-active agents are used in sufficient amounts to impart water-dispersibility to the powder.

Liquid herbicidal compounds can be prepared by intimately dispersing or dissolving one or more of the active compounds in conventional organic liquid herbicidal carriers or in water.

Dust formulations can be prepared by admixing one or more of the active compounds with a finely divided carrier such as those set forth in the aforementioned patents.

The herbicidal method of the present invention comprises applying a compound of the invention ordinarily in a herbicidal composition of the aforementioned type to the locus or area to be protected from undesirable plant growth. The active ingredient is, of course, applied in a sufficient amount to exert the desired herbicidal action. The application can be made directly upon the locus or area and the vegetation thereon during the period of infestation. Alternatively, the application can be made in advance of an anticipated weed infestation.

The dosage employed can be determined readily by those skilled in the art by conventional techniques. It is dependent upon the particular active ingredient employed and the nature of the formulation used, the type of treatment, the type of vegetation to be controlled, climatic conditions and the like. In general when applied as a foliar spray a dosage of about 20 to 60 pounds of the active ingredient per acre is used.

This method is applicable to the control of both broad-leaved and grass, annual and perennial weeds such as crab grass, Johnson grass, wild mustard, dandelion, lambs quarter, rough pigweed, and plantain. The compounds are particularly useful for treatment of the soil to kill the weeds within a short time after germination. A particular advantage of the compounds of the invention is that they have a lower activity against valuable crops than do many available conventional weed killers.

The following example serves to illustrate the herbicidal compositions of the invention and methods of application.

EXAMPLE VIII 2,2,2-trichloro-1-hydroxyethyl trichlorothiolacetate as prepared in Example III was formulated as follows, with "Velsicol" AR–50 (a commercially available alkylated naphthalene) for use as a herbicide for brush-type weeds. A mixture of 40 grams of the above thiolacetate was dissolved in 100 ml. of "Velsicol" AR–50. This solution was extended with diesel oil or kerosene to form a solution having 0.1 to 1% by weight of the chlorothiol ester. When sprayed on Johnson grass, the 1% solution decreased markedly the rate of growth of the plant. When sprayed at a 1% concentration on dandelion, the plant died.

In a similar manner formulations containing compounds of the invention either kill plants or exhibit marked hormone effects, depending upon the thiol ester used and its concentration.

The following herbicidal compositions can be formulated by blending the following listed ingredients together in a ribbon blender, and micropulverizing until substantially all the particles are below 50 microns in diameter.

(A)

| | Percent |
|---|---|
| Hydroxymethyl 2,4,5-trichlorophenoxythiolacetate | 50 |
| Sodium lauryl sulfate | 1.0 |
| Methyl cellulose (15 cps.) | 0.25 |
| Attapulgite clay | 48.75 |

(B)

| | |
|---|---|
| Hydroxymethyl 2,3,6-trichlorothiolbenzoate | 75 |
| Polyoxyethylene esters of mixed fatty and resin acids | 2 |
| Synthetic fine silica | 23 |

These compositions can then be extended with water to form sprayable formulations containing 1% by weight of the active ingredient and applied at a dosage of 60 pounds per acre of the active ingredient to an area infested with a wide variety of weeds including crab grass, yellow foxtail, Johnson grass, trumpet vine and honeysuckle, ragweed and dandelion to control the weeds.

The following herbicidal composition can be prepared by blending together the listed ingredients in a ribbon blender and then micropulverizing until substantially all of the particles are below 50 microns in diameter.

| | Percent |
|---|---|
| Hydroxymethyl 2,4-dichlorophenoxythiolacetate | 50 |
| Alkyl naphthalene sulfonic acid, sodium salt | 1.5 |
| Low viscosity methyl cellulose | 0.25 |
| Synthetic fine silica | 48.25 |

This composition can be extended with water and applied to weed infested areas in accordance with the above procedure of the previous example to give excellent weed control.

The following emulsifying oil can be prepared by simple mixing of the three components listed. It may be diluted with oil or water before application.

| | Percent |
|---|---|
| p-Chloro-α-hydroxybenzyl-4-chlorothiolbenzoate | 25 |
| Mixed polyoxyethylene modified fatty amines | 5 |
| Xylene | 70 |

This formulation can be emulsified by adding 200 pounds of the composition to 200 gallons of water. It can be applied at the rate of 50 pounds per acre (active ingredient) by using conventional spray equipment to control broad-leaved and grass weeds, woody brush and vines for an extended period of time without undesirable effects on economically desirable foliage growing adjacent to the treated areas.

The following ingredients can be thoroughly mixed until a homogeneous oil formulation results.

| | Percent |
|---|---|
| 2,2,2-trichloro-1-hydroxyethyl trichlorothiolacetate | 25 |
| Mixed polyoxyethylene esters of fatty acids and oil soluble petroleum sulfonates | 5 |
| Diesel oil | 70 |

This formulation can then be diluted with diesel oil and sprayed at the rate of 45 pounds per acre of the active ingredient in 150 gallons of diesel oil onto weed infested areas.

The following active ingredient and diatomaceous silica composition can be blended and micropulverized.

| | Percent |
|---|---|
| 3,4-dichloro-α-hydroxybenzyl thiolbenzoate | 10 |
| Diatomaceous silica | 30 |
| Micaceous talc | 60 |

The product can then be blended with a major diluent in a ribbon blender to yield a dust suitable for application with conventional dusting equipment. The composition is useful for application at the rate of 550 pounds per acre of the formulated product for the control of broad-leaved and grass weeds such as around telephone poles and bridge abutments.

I claim:

1. A method for the control of weeds which comprises applying to the locus to be protected in an amount sufficient to exert a herbicidal effect a compound of the formula

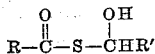

wherein R contains up to 7 carbon atoms and is selected from the group consisting of aliphatic hydrocarbon, aromatic hydrocarbon, aryloxymethyl, halogenated hydrocarbon and halogenated aryloxymethyl having no more than two hydrogens attached to the alpha carbon and R' is selected from the group consisting of hydrogen, aliphatic hydrocarbon of up to 7 carbon atoms, aromatic hydrocarbon of up to 7 carbon atoms and halogenated hydrocarbon of up to 7 carbon atoms with the proviso that at least one of R and R' contains halogen, said halogen being selected from the group consisting of chlorine and bromine, and both R and R' being free from open-chain carbon-to-carbon unsaturation.

2. A compound of the formula

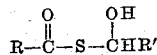

wherein R contains up to 7 carbon atoms and is selected from the group consisting of aliphatic hydrocarbon, aromatic hydrocarbon, aryloxymethyl, halogenated hydrocarbon and halogenated aryloxymethyl having no more than two hydrogens attached to the alpha carbon and R' is selected from the group consisting of hydrogen, aliphatic hydrocarbon of up to 7 carbon atoms, aromatic hydrocarbon of up to 7 carbon atoms and halogenated hydrocarbon of up to 7 carbon atoms with the proviso that at least one of R and R' contains halogen, said halogen being selected from the group consisting of chlorine and bromine, and both R and R' being free from open-chain carbon-to-carbon unsaturation.

3. The compounds of claim 2 wherein the halogen which R and R' contain is chlorine.

4. 2,2,2-trichloro-1-hydroxyethyl thiolbenzoate.
5. 2,2,2-trichloro-1-hydroxyethyl trichlorothiolacetate.
6. p-Chloro-α-hydroxybenzyl 4-chlorothiolbenzoate.
7. 3,4-dichloro-α-hydroxybenzyl thiolbenzoate.
8. Hydroxymethyl 2,4-dichlorophenoxythiolacetate.
9. Hydroxymethyl 2,4,5-trichlorophenoxythiolacetate.
10. Hydroxymethyl 2,3,6-trichlorothiolbenzoate.
11. The process comprising reacting a thiol acid of the formula

wherein R is selected from the group consisting of aliphatic hydrocarbon, aromatic hydrocarbon, aryloxymethyl, halogenated hydrocarbon and halogenated aryloxymethyl, said R having up to seven carbon atoms, with an aldehyde of the formula R'CHO wherein R' is selected from the group consisting of hydrogen, aliphatic hydrocarbon of up to seven carbon atoms, aromatic hydrocarbon of up to seven carbon atoms and halogenated hydrocarbon of up to seven carbon atoms with the provisos that at least one of R and R' contains halogen, said halogen being selected from the group consisting of chlorine and bromine, and both R and R' are free from open-chain carbon-to-carbon unsaturation, whereupon compounds of the formula

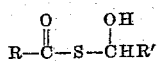

wherein R and R' have the same significance as above, are obtained.

References Cited in the file of this patent

UNITED STATES PATENTS 2,427,582    Vinton    Sept. 16, 1947

FOREIGN PATENTS 869,064    Germany    Mar. 2, 1953